US012122478B2

(12) United States Patent
Moroni

(10) Patent No.: US 12,122,478 B2
(45) Date of Patent: Oct. 22, 2024

(54) SYSTEM AND METHOD FOR CONTROLLING VEHICLE ATTITUDE AND VEHICLE EQUIPPED WITH SAID SYSTEM

(71) Applicant: QOODER S.A., Vacallo (CH)

(72) Inventor: Marco Moroni, Gorla Minore (IT)

(73) Assignee: Qooder S.A., Vacallo (CH)

( * ) Notice: Subject to any disclaimer, the term of this patent is extended or adjusted under 35 U.S.C. 154(b) by 328 days.

(21) Appl. No.: 17/435,773

(22) PCT Filed: Mar. 4, 2020

(86) PCT No.: PCT/IB2020/051824
§ 371 (c)(1),
(2) Date: Sep. 2, 2021

(87) PCT Pub. No.: WO2020/178751
PCT Pub. Date: Sep. 10, 2020

(65) Prior Publication Data
US 2022/0048588 A1    Feb. 17, 2022

(30) Foreign Application Priority Data

Mar. 5, 2019    (IT) .......................... 102019000003179

(51) Int. Cl.
B62K 5/027    (2013.01)
B60K 17/32    (2006.01)
(Continued)

(52) U.S. Cl.
CPC .............. B62K 5/027 (2013.01); B60K 17/32 (2013.01); B60L 15/2036 (2013.01); B62D 9/02 (2013.01);
(Continued)

(58) Field of Classification Search
CPC ... B60G 3/00; B60G 3/02; B60G 3/04; B60G 3/18; B60G 2204/421; B62K 5/027;
(Continued)

(56) References Cited

U.S. PATENT DOCUMENTS 3,424,261 A    1/1969  Sheldon
4,647,067 A *  3/1987  Paquette ................ B62D 61/12
                                                280/6.154
(Continued)

FOREIGN PATENT DOCUMENTS

CN    204527446 U    8/2015
EP    2046589 A1    4/2009
(Continued)

OTHER PUBLICATIONS

Machine translation of EP-2484543-A1 retrieved from PE2E Search on Oct. 20, 2023 (Year: 2023).*
(Continued)

Primary Examiner — Thomas Ingram
Assistant Examiner — Faris Asim Shaikh
(74) Attorney, Agent, or Firm — Armstrong Teasdale LLP

(57) ABSTRACT

A motor vehicle with at least a first driving wheel tilting with respect to a first rotation axis transverse to the motor vehicle and a second driving wheel tilting with respect to a second rotation axis transverse to the motor vehicle has a power source for power generation and a transmission for power transmission to the first tilting driving wheel and second tilting driving wheel.

18 Claims, 6 Drawing Sheets

(51) Int. Cl.
  *B60L 15/20* (2006.01)
  *B62D 9/02* (2006.01)
  *B62K 25/20* (2006.01)
(52) U.S. Cl.
  CPC ........... *B62K 25/20* (2013.01); *B60L 2200/12* (2013.01); *B60L 2240/22* (2013.01)
(58) Field of Classification Search
  CPC ...... B62K 25/20; B62K 5/10; B62K 2204/00; B62K 25/283; B60K 17/32; B60K 2001/0422; B60K 1/02; B60L 15/2036; B60L 2200/12; B60L 2240/22; B60L 2220/42; B62D 9/02; Y02T 10/64; Y02T 10/72; B60Y 2200/122; B60Y 2200/91; B62J 43/16
  See application file for complete search history.

(56) References Cited

U.S. PATENT DOCUMENTS

| | | | |
|---|---|---|---|
| 6,722,459 B1 | 4/2004 | Wendl et al. | |
| 8,439,140 B1 | 5/2013 | Amortegui et al. | |
| 2003/0217874 A1* | 11/2003 | Schoenberg | B60L 8/003 |
| | | | 180/2.2 |
| 2008/0238005 A1* | 10/2008 | James | B62D 9/02 |
| | | | 280/5.509 |
| 2009/0312908 A1* | 12/2009 | Van Den Brink | B62D 9/02 |
| | | | 280/5.509 |
| 2010/0071983 A1* | 3/2010 | Holland | B62K 5/027 |
| | | | 903/902 |
| 2010/0243349 A1* | 9/2010 | Nomura | B60K 6/48 |
| | | | 180/65.22 |
| 2011/0177903 A1 | 7/2011 | Campbell | |
| 2013/0284528 A1 | 10/2013 | Kawasaki et al. | |
| 2014/0000970 A1 | 1/2014 | Munster et al. | |
| 2014/0252733 A1* | 9/2014 | Spahl | B60G 21/05 |
| | | | 280/5.5 |
| 2016/0075177 A1* | 3/2016 | Biderman | B60L 58/21 |
| | | | 301/6.5 |
| 2016/0176473 A1* | 6/2016 | Faille | B62M 6/70 |
| | | | 477/3 |
| 2016/0318579 A1* | 11/2016 | Miyashiro | B62J 13/02 |
| 2017/0008591 A1* | 1/2017 | Abbott | B62K 5/08 |
| 2018/0154966 A1* | 6/2018 | Yeo | B62J 17/08 |
| 2018/0201081 A1 | 7/2018 | Holtheide et al. | |
| 2018/0208259 A1* | 7/2018 | van Wijk | B62D 9/02 |
| 2020/0009969 A1* | 1/2020 | Kamada | B60G 3/20 |
| 2020/0262263 A1* | 8/2020 | Doerksen | B60G 17/0162 |
| 2020/0354018 A1* | 11/2020 | Hiramatsu | B60L 50/20 |
| 2022/0017121 A1* | 1/2022 | McLean | G06V 20/593 |
| 2023/0182813 A1* | 6/2023 | Doerksen | B60G 17/018 |
| | | | 280/5.507 |

FOREIGN PATENT DOCUMENTS

| | | | | |
|---|---|---|---|---|
| EP | 2335961 A1 | | 6/2011 | |
| EP | 2484543 A1 | * | 8/2012 | ........... B60G 17/016 |
| JP | H03109190 A | | 5/1991 | |
| JP | 2013193693 A | | 9/2013 | |
| JP | 2014039449 A | | 2/2014 | |
| JP | 2018161962 A | | 10/2018 | |
| WO | 0103963 A1 | | 1/2001 | |
| WO | 2017008966 A1 | | 1/2017 | |
| WO | WO-2017076783 A1 | * | 5/2017 | ............. B60G 21/05 |
| WO | 2019044119 A1 | | 3/2019 | |
| WO | 2020157664 A1 | | 8/2020 | |

OTHER PUBLICATIONS

Machine translation of WO-2017076783-A1 retrieved from PE2E Search on Oct. 20, 2023 (Year: 2023).*
International Search Report and Written Opinion for International Patent Application No. PCT/IB2020/051824, mailed Apr. 15, 2020, 12 pages.
International Preliminary Report on Patentability for International Patent Application No. PCT/IB2020/051824, mailed Jun. 15, 2021, 17 pages.

* cited by examiner

SYSTEM AND METHOD FOR CONTROLLING VEHICLE ATTITUDE AND VEHICLE EQUIPPED WITH SAID SYSTEM

CROSS-REFERENCE TO RELATED APPLICATIONS

This application is a National Phase Application of PCT International Application No. PCT/IB2020/051824, having an International Filing Date of Mar. 4, 2020, which claims priority to Italian Application No. 102019000003179, filed Mar. 5, 2019, each of which is hereby incorporated by reference in its entirety.

FIELD OF THE INVENTION

The present invention relates to the field of vehicles with tilting wheels. In particular, the present invention relates to the field of motorcycles with at least two tilting wheels, in particular positioned on the same transverse axis. In detail, the present invention relates to a device and/or a system, as well as a method, suitable for improving the tilting performance in vehicles and in particular motorcycles of the above mentioned type. Still more in detail, the present invention relates to the field of the aforementioned electric or hybrid drive vehicles and relates to a device and/or a system and a method for the intelligent management and/or the control of the attitude of vehicles and/or motorcycles of the type above. Finally, the present invention relates to a vehicle, in particular an electric drive motorcycle, with at least two tilting wheels equipped with a device or system of the aforementioned type.

BACKGROUND

Tilting wheel vehicles are known in the state of the art and are now widely diffused and appreciated by users, wherein the definition "tilting wheel vehicles" means vehicles, in particular motorcycles, scooters, quads or the like, which are equipped with at least one pair of tilting wheels, for example motorcycles with at least two front tilting wheels and one (generally) non-tilting rear wheel, where vehicles with two rear swinging wheels also fall within the definition, as well as four-wheeled vehicles with at least one pair of tilting wheels.

The main feature of the above-mentioned tilting wheel vehicles is that the (at least two) tilting wheels are able to tilt sideways thanks to the presence of a so-called tilting system of the wheels arranged side by side in the transverse direction—in general, but as said not exclusively, the front wheels.

Tilting-wheel vehicles (hereinafter also referred to as "tilting vehicles" for the sake of brevity), are generally equipped with a swinging locking device that can be activated by the driver according to needs and/or circumstances.

In particular, devices and/or systems are known, wherein the tilting block (or swinging lock) can be activated by the driver, by means of a switch, at speeds below a threshold established by the vehicle specifications (and therefore by the manufacturer), generally equal to a few Km per hour, where the swing or tilt lock is automatically deactivated when the driver first opens the accelerator.

The tilting blocking devices and/or systems according to the prior art summarized briefly previously, although appreciable from different points of view such as ease of implementation and substantially contained costs, are however not free of problems and/or drawbacks that the present invention aims to solve and overcome, respectively.

A first problem or disadvantage relates to the fact that, when the vehicle remains within the speed threshold in which the block is allowed, and with the tilting system blocked, that is, when the tilting is blocked but the vehicle still moves, the latter could encounter a hole or an unevenness (unfortunately these situations are frequent and derive from an uneven road surface), but also a manhole or in any case a difference in height, such as to cause a lateral imbalance (on the right or left respectively) of the vehicle with respect to the vertical plane, and remain in the tilted locked condition until the unlock speed is reached (in the case of automatic locking devices) or until the manual release of the swing lock, normally by means of a button on the handlebar (in the case of devices with manual insertion and deactivation of the block). In these cases, there is a real and effective risk that at the restart, with the consequent swing unlock, the driver is in serious difficulty because the vehicle is not perfectly vertical and, during the "recovery" phase with progressive increase in speed, tends to fall sideways, wherein to counteract the imbalance the driver is forced to intervene on the steering with a maneuver that inevitably involves a change of trajectory, with the real risk of collision with other vehicles or in any case with the risk of jumping into the adjacent roadway or lane.

In addition, in general terms, a further disadvantage relates to the fact that in the event of roughness (pit or manhole cover), facing an obstacle with a vehicle that has the tilt system locked can also cause the lateral overturning of the same with the resulting consequences for the vehicle, driver and possible passenger, as well as for people or things that are nearby. Vehicles are also known, in particular electric or hybrid traction motorcycles, also known as electric and/or hybrid traction motor vehicles and/or motorcycles, which are penalized by the disadvantages summarized above.

SUMMARY OF THE INVENTION

The scope of the present invention is therefore to provide a solution which allows to overcome in an effective and reliable way the problems and/or disadvantages summarized above and related to devices and/or systems for blocking the tilting according to the known art.

A further scope of the present invention is to provide a device, system or method by which it is possible to actively control and manage the motion of the suspension, thus guaranteeing the maintenance of the verticality of the titling vehicle in low speed travel and in temporary stops.

In particular, among the scopes of the present invention is that of keeping the vehicle in a substantially vertical position preferably automatically, without requiring the driver to lay his feet on the ground to maintain balance, and regardless of the conditions of the terrain and road surface, in particular in "Quad mode" (see the following description).

According to the present invention, by controlling the movement of the suspension it is also possible to adjust the tilting angle (inclination) of the vehicle in normal driving conditions, therefore from low to high speeds, in this way controlling and guaranteeing stability, and therefore avoiding dangerous skidding.

In particular, a further scope of the present invention is to provide a device and/or system and/or method which allows to:

ensuring three or more wheeled vehicles to keep verticality (preferably, in an automatic way) in the condition of use defined as "quad mode", where normally the user uses his feet on the ground, that is, when driving at reduced speed and in temporary parking in general (red light, stop etc.);

performing and controlling the tilting of the above vehicles by performing the ideal tilting angle according to contingent travel and/or use parameters.

It also falls within the scope of the present invention to provide a device of the aforesaid type which can be implemented in a wide range of vehicles and without requiring substantial modifications thereof, as well as being feasible and installable by means of simple and fast operations, and therefore at low costs.

DESCRIPTION OF THE PRESENT INVENTION

The present invention derives from the general consideration according to which, at least in electric or hybrid traction motorcycles, the aims summarized above can be effectively achieved by providing a system suitable for allowing the transmission of motion to the drive wheels, in particular if they are of the tilting type, in an active way and according to contingent conditions.

In fact, according to a further aspect of the present invention, in the case of lateral vehicle imbalance, for example, the straightening or rearrangement of the vehicle can be obtained quickly and reliably by imparting different traction torques to the two driving wheels according to parameters such as the inclination of the vehicle, the instantaneous speed, etc., in particular traction torques which may be also directed in opposite directions from each other, depending on the contingent situation.

A further aspect of the present invention relates to the fact that even more satisfactory results, in terms of rearrangement of the vehicle or motorcycle, are guaranteed by the use of a traction management system as previously summarized (and described in detail below), conveniently combined with an active hydro-pneumatic system for managing the tilting of two wheels of a vehicle as described in patent application 102019000001247 in the name of the applicant, in which a motorized hydraulic pump connected to the hydraulic suspension system is operated by a software that processes the signals of the devices placed on the vehicle (speed sensors, inertial platform, engine revs, etc.) and which, as a function of them, delivers the fluid contained inside the suspension in one direction rather than the other, or from a cylinder to the other or vice versa, also making use of the contribution of one or more solenoid valves, in this way ensuring the verticality to be kept by the vehicle when stationary and at low speed and/or the control of the tilt angle of the vehicle during curves, with a clear improvement in the stability of the vehicle.

Based on the above consideration, and in order to overcome the disadvantages of suspension locking systems according to the prior art and/or to achieve the further scopes mentioned above, the present invention relates to a motor vehicle with at least one first driving wheel R1 and a second driving wheel R2 each tilting with respect to a respective tilting axis transverse to said vehicle, said vehicle comprising a power source for power generation and a transmission for power transmission to said first tilting driving wheel R1 and second tilting driving wheel R2; wherein said power source comprises separate and independent first electric motor 12 and second electric motor 13, wherein said transmission comprises two sections configured to transmit power from said first electric motor 12 to said first tilting drive wheel R1 and respectively from said second electric motor 13 to said second tilting driving wheel R2 independently, and wherein said vehicle comprises an electronic control unit adapted to receive and process one or more parameters and to control said first electric motor 12 and second electric motor 13 as a function of said one or more parameters, whereby the control of said first electric motor 12 and/or second electric motor 13 by said control unit as a function of said one or more parameters results in the independent transmission of power from said first electric motor 12 and/or second motor 13 to said first tilting driving wheel R1 and/or second tilting wheel R2, respectively.

Such parameters can be acquired and transmitted to the control unit automatically (for example, as will be better appreciated below, by means of sensors or detection devices that detect and/or measure parameters such as driving speed, chassis inclination, etc.), so that the attitude adjustment can be automatic depending on the mapping of the control unit and the algorithm with which these parameters are processed by such control unit. Alternatively, or in combination, these parameters may be indicative of a voluntary action by the driver to force the control unit to adjust the vehicle attitude in the way desired by the user; this is the case, for example, where the parameters are indicative of the state of activation or non-activation of a control device that can be operated by the user (e.g. a switch that can be switched by pressing a button, rotating a knob, etc.).), in which case the relevant parameter may be either the output of an electrical signal from the control device (when the control device is of the on-off type, for example), or the degree of actuation of the control device (pressure exerted by the user on the control device, angular excursion given by the user to the knob, etc.), the value of which, possibly also as a function of time (so that, for example, the response of the vehicle be proportionally more intense as the speed at which the user performs the action increases), may be conveniently detected by means of dedicated sensors.

According to an embodiment, at least said first electric motor 12 is adapted to be rotated in two opposite directions of rotation so that the power generated and transmitted to said first tilting driving wheel R1 results into a rotation of the said first tilting driving wheel R1 according to the direction of travel and opposite to the direction of travel, respectively.

According to an embodiment, also said second motor 13 is adapted to be rotated in two opposite directions of rotation so that the power generated and transmitted to said second tilting drive wheel R2 results into a rotation of said second tilting drive wheel R2 according to the direction of travel and opposite to the direction of travel, respectively.

According to an embodiment, said first electric motor 12 or both said first electric motor 12 and second electric motor 13 respectively are configured so as to transform the forced deceleration into the generation of electric energy, wherein the deceleration of said first electric motor 12 or respectively both said first electric motor 12 and second electric motor 13 is controlled by said control unit according to said one or more parameters.

According to an embodiment, said first electric motor 12 and second electric motor 13 comprise respectively a first rotation shaft 14 and a second rotation shaft 15, wherein said first rotation shaft 14 and second rotation shaft 15 are arranged parallel to said transversal rotation axis of said first tilting driving wheel R1 and second tilting driving wheel R2.

According to an embodiment, said first section and second section of said transmission comprise a first pulley 16 rigidly keyed on said first rotation shaft 14 and a second pulley 17 rigidly keyed on the second rotation shaft 15, respectively, and a first transmission belt 18 and a second transmission belt 19 respectively driven in rotation by said first pulley 16 and second pulley 17, respectively.

According to an embodiment, said first transmission belt 18 and second transmission belt 19 extend between said first pulley 16 and second pulley 17 and respectively a third pulley 20 and a fourth pulley 21.

According to an embodiment, said third pulley 20 and fourth pulley 21 are rigidly coupled to said first tilting driving wheel R1 and said second tilting driving wheel R2, respectively.

According to an embodiment, said first rotation shaft 14 and second rotation shaft 15 are arranged along the same axis parallel to said transversal rotation axis of said first tilting driving wheel R1 and second tilting driving wheel R2.

According to an embodiment, said third intermediate pulley 20 and fourth intermediate pulley 21 are idle, i.e. driven in rotation by a belt or transmission element, whereby by hypothetically removing the engagement of said belt or element transmission on each of said third pulley 20 and fourth pulley 21, each of the pulleys 20 and 21 is free to rotate in two opposite directions of rotation.

According to an embodiment, said first section and second section of said transmission comprise a third transmission belt 22 and a fourth transmission belt 23 driven in rotation by said third pulley 20 and fourth pulley 21 respectively.

According to an embodiment, said first section and second section of said transmission comprise a fifth pulley 24 and a sixth pulley 25 respectively driven in rotation by said third transmission belt 22 and fourth transmission belt 23 and rigidly coupled to said first tilting driving wheel R1 and said second tilting driving wheel (R2) respectively.

According to an embodiment, said two tilting drive wheels R1, R2 are mechanically anchored to the chassis of said vehicle by means of a first oscillating anchor arm B1 and a second oscillating anchor arm B2 respectively.

According to an embodiment, said vehicle comprises a plurality of sensors and/or measuring means for detecting and/or respectively measuring parameters such as running speed, inclination of said chassis, forces acting on said first anchor arm B1 and second anchor arm B2, wherein said sensors and/or measuring means are connected to said control unit and configured to communicate to the said control unit the results of the respective detections and/or measurements.

According to an embodiment, said vehicle is a three-wheeled vehicle, said two tilting driving wheels R1, R2 being arranged along a common axis positioned posteriorly with respect to the third wheel of said vehicle.

As mentioned above, the system according to the present invention is preferably adapted to be used in combination with (to be combined with) an active hydro-pneumatic system for controlling the tilting of two wheels of a vehicle mechanically anchored to the chassis of said vehicle by means of a first oscillating anchor arm and a second oscillating anchor arm, the system comprising at least a first cylinder and a second cylinder adapted to be interposed between said frame and said first oscillating anchor arm and said second oscillating anchor arm, respectively, wherein said first and second cylinders respectively comprise a first chamber and a second chamber both of variable volume and defined by a first translatable piston housed in said first cylinder and respectively a second translatable piston housed in said second cylinder, said first chamber and second chamber containing a incompressible liquid, wherein the transfer of said incompressible liquid from said first chamber to said second chamber results in an increase in the volume of said second chamber while the transfer of said incompressible liquid from said second chamber to said first chamber results in an increase in the volume of said first chamber, and wherein said system comprises first connecting means which put said first chamber and said second chamber into fluid communication so that said incompressible liquid can be transferred alternately from said first chamber to said second chamber and from said second chamber to said first chamber; wherein said system comprises an electric pump in fluid connection with said first connection means, wherein said system further comprises a control unit for the electric control of said electric pump, and wherein said unit is suitable for receiving and processing one or more parameters and to electrically control said electric pump as a function of said one or more parameters, wherein therefore the electric operation of said electric pump as a function of said one or more parameters results in the transfer of said incompressible liquid, by means of said electric pump, from said first chamber to said second chamber or from said second chamber to said first chamber according to said one or more parameters.

According to an embodiment, said system comprises a solenoid valve in fluid connection with said first connection means and said electric pump, wherein said solenoid valve is electrically controlled by said control unit and switchable between a closed position, in which it prevents the transfer of said incompressible liquid between said first chamber and second chamber, and one or more opening positions, in which the transfer of fluid between said first chamber and second chamber is possible.

According to an embodiment, said system comprises second connection means by means of which said first chamber and second chamber are put in fluid communication.

According to an embodiment, said system comprises a circuit fluid tank connected to said three-way valve.

According to an embodiment, said system comprises shut-off means arranged along said second connection means and electrically controlled, wherein said shut-off means are switchable between a closed position, in which said first chamber and second chamber are not put in fluid communication by means of said second connection means, and one or more opening positions in which said first chamber and second chamber are put in fluid communication by means of said second connection means.

According to an embodiment, said system comprises first accumulation means in fluid communication with said second connection means, wherein the transfer of said incompressible liquid from said first chamber into said second chamber and from said second chamber into said first chamber results in the accumulation of at least part of said incompressible liquid in said accumulation means.

According to an embodiment, said shut-off means are interposed between said second connection means and said first accumulation means, wherein said shut-off means comprise a three-way valve switchable between a first position, in which said first chamber and second chamber are not in fluid communication and said first accumulation means are not in fluid communication with said second connection means, a second position in which said first chamber and second chamber are put in fluid communication by means of said second connection means and said first accumulation means are not in fluid communication with said second connection means, and a third position in which said first chamber and second chamber are put in fluid communication by means of said second connection means and said first accumulation means are put in fluid communication with said second connection means.

According to an embodiment, said shut-off means are interposed between said second connection means and said first accumulation means, wherein said shut-off means comprise three on-off valves arranged in series and mutually switchable between a first configuration in which said first chamber and second chamber are not in fluid communication and said first accumulation means are not in fluid communication with said second connection means, a second configuration in which said first chamber and second chamber are in fluid communication by means of said second connection means and said first accumulation means are not in fluid communication with said second connection means, and a third configuration in which said first chamber and second chamber are in fluid communication by means of said second connection means and said first accumulation means are in fluid communication with said second connection means.

According to an embodiment, said first accumulation means are defined by a third chamber with variable volume limited by a third translatable piston housed in a third cylinder, wherein said third cylinder comprises a fourth chamber with variable volume containing compressible gas and positioned with respect to said third chamber so that the accumulation of said incompressible liquid in said third chamber results in the expansion of said third chamber and in the compression of said gas in said fourth chamber with consequent decrease in volume of said fourth chamber.

According to an embodiment, said system comprises second accumulation means in fluid communication with said first connection means, wherein the transfer of said incompressible liquid from said first chamber into said second chamber and from said second chamber into said first chamber results in the accumulation of at least part of said incompressible liquid in said second accumulation means.

According to an embodiment, said second accumulation means are defined by a fifth chamber and sixth chamber both of variable volume and defined by a fourth translatable piston housed in a fourth cylinder and respectively a fifth translatable piston housed in a fifth cylinder, wherein said fourth cylinder and fifth cylinder comprise a seventh chamber and an eighth chamber respectively, both with variable volume and containing compressible gas, said seventh chamber and eighth chamber being positioned with respect to said fifth chamber and respectively sixth chamber so that the accumulation of said incompressible liquid in said fifth chamber and sixth chamber results into the expansion of said fifth chamber and sixth chamber and the compression of said gas in said seventh chamber and eighth chamber respectively with consequent decrease in volume of said seventh chamber and eighth chamber respectively.

The present invention is therefore particularly advantageous in a vehicle with at least two tilting wheels mechanically anchored to the frame of the said vehicle by means of a first oscillating anchor arm and a second oscillating anchor arm, said vehicle being provided with an electrical control system of the attitude according to one of the embodiments summarized above and, preferably, an active hydro-pneumatic system for controlling the tilting of said two tilting wheels.

According to an embodiment, said vehicle comprises a plurality of sensors and/or measuring means for respectively detecting and/or measuring parameters such as running speed, tilting of said chassis, stresses acting on said first anchor arm and second anchor arm, wherein said sensors and/or measuring means are connected to said control unit and configured to communicate to said control unit the results of the respective detections and/or measurements.

According to an embodiment, said vehicle is a three-wheeled vehicle with two front tilting wheels arranged along a common transverse axis.

According to an embodiment, said vehicle is a three-wheeled vehicle with two rear tilting wheels arranged along a common transverse axis.

According to an embodiment, said vehicle is a four-wheeled vehicle with two front and/or rear tilting wheels arranged along a common transverse axis.

Further possible embodiments of the present invention are defined by the claims.

BRIEF DESCRIPTION OF THE DRAWINGS

Below, the present invention will be clarified by means of the following detailed description of the embodiments represented in the drawings. However, the present invention is not limited to the embodiments described below and represented in the drawings; on the contrary, all those variants of the embodiments described below and represented in the drawings, which will be obvious to those skilled in the art, are within the scope of the present invention.

In the drawings.

DETAILED DESCRIPTION

The present invention is particularly advantageous application when used for the management and/or control of the attitude of electric-powered tilting motorcycles with tilting drive wheels, this being the reason why the present invention will be described below with particular reference to tilting motorcycles of the aforementioned type, wherein the present invention can be suitably interfaced with a hydro pneumatic suspension which controls the swinging of three or more wheeled vehicles, such as for example a suspension of the HTS type, as described in patent EP 2 046 589 in the name of the applicant and/or in patent application No. 102019000001247, also in the name of the applicant.

In particular, the present invention can be implemented on tilting vehicles designed with closed bodywork of the automotive type, with an improvement in driving comfort and safety.

Figure 1:
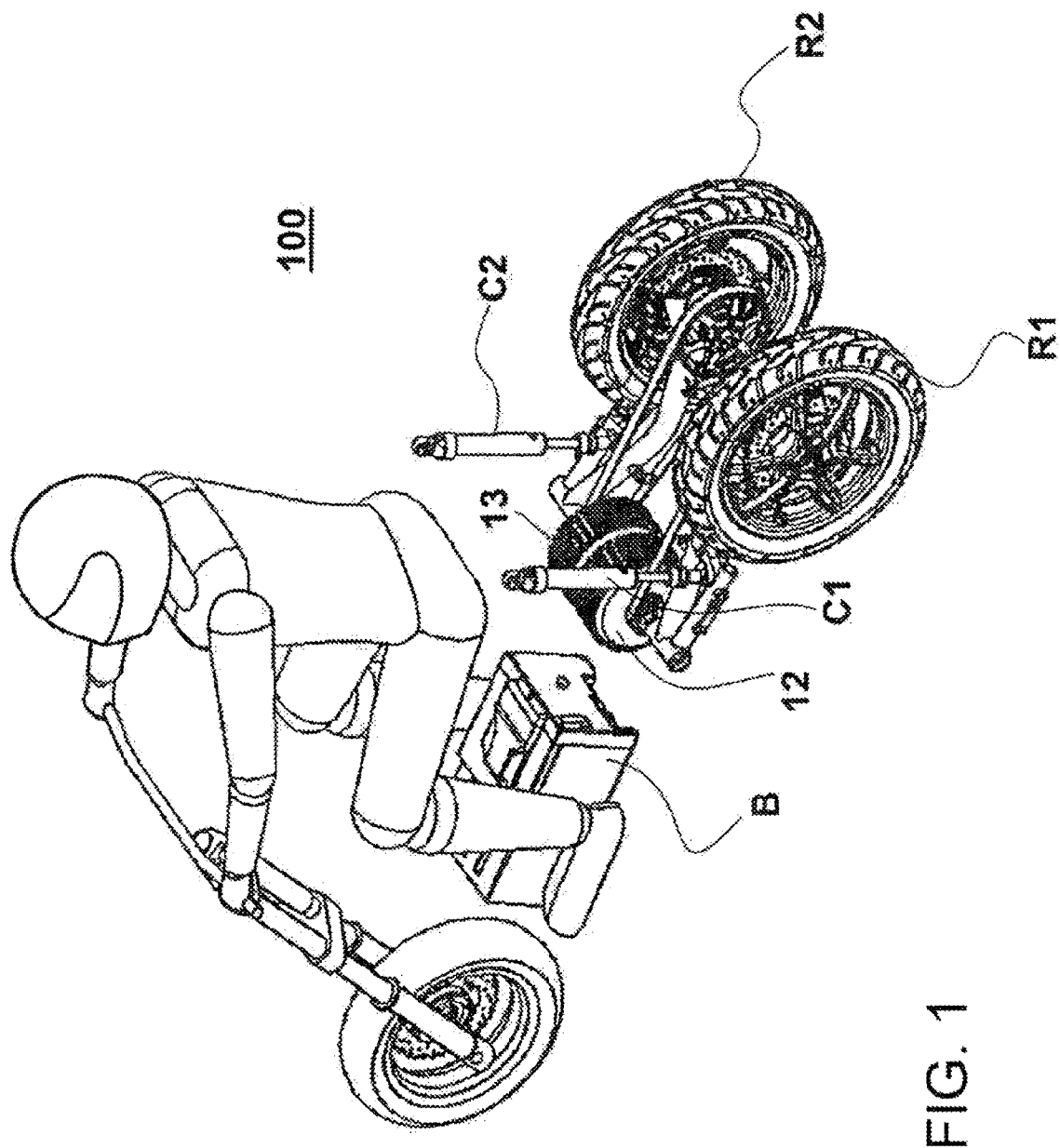
FIGS. 1 to 4 show perspective views of vehicles equipped with devices or systems according to respective embodiments of the present invention.
Figure 2:
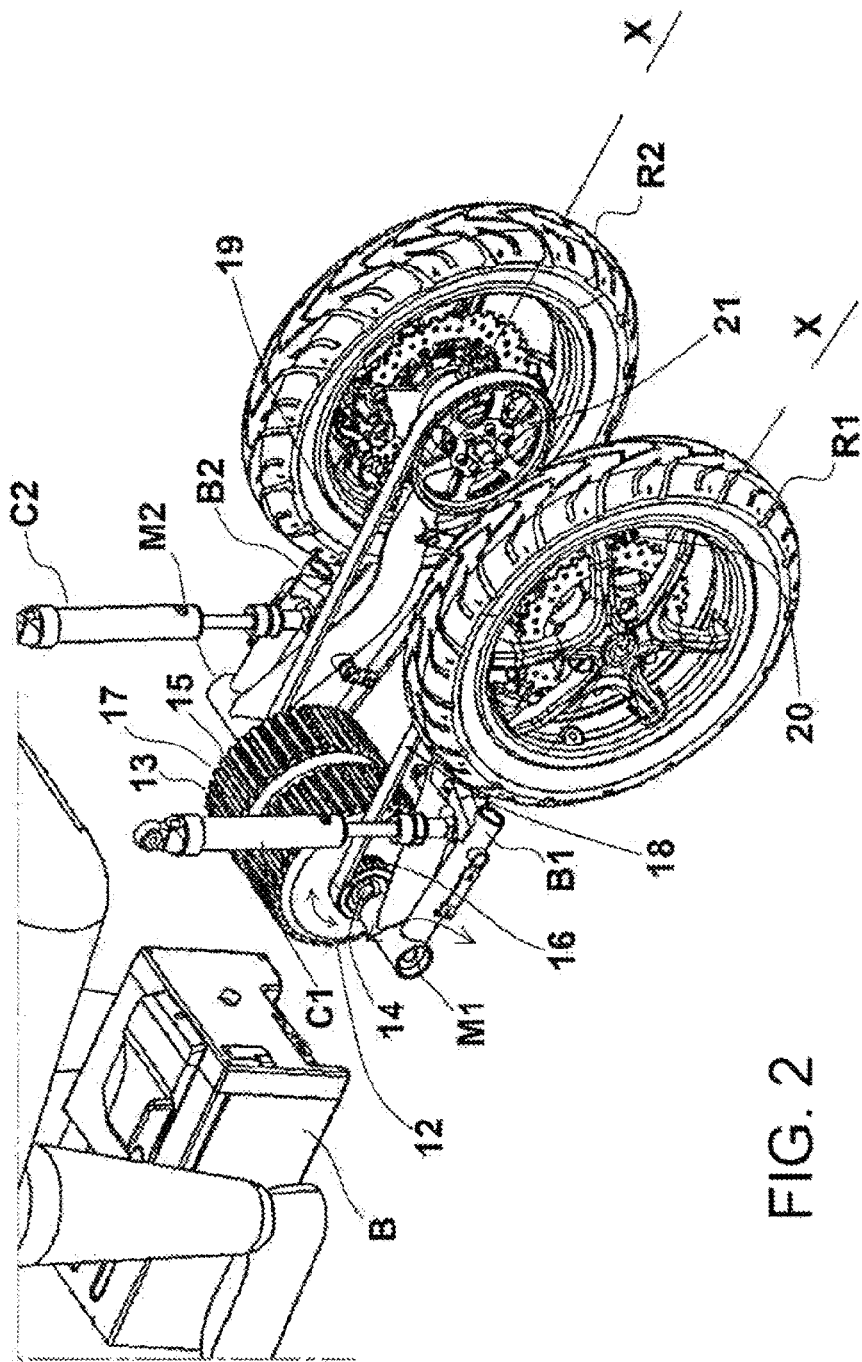

In the figures are visible: two drive wheels R1 and R2 of a vehicle 100, arranged side by side in the transverse direction of the vehicle 100 and mechanically supported respectively by a first oscillating anchor arm B1 and a second oscillating anchor arm B2, wherein each of the two arms B1 and B2, at their end portion, is rotatably anchored to a rotation hub M1 and M2 respectively, the two arms B1 and B2 being therefore rotatable on the hub M1 and M2 respectively in the two opposite directions of rotation indicated by the double arrows in FIGS. 1 and 2.

Each of the two arms B1 and B2 is also conveniently fork-shaped to define a coupling for a first cylinder C1 and a second cylinder C2 respectively, both cylinders C1 and C2 being part of a suspension system and therefore being interposed between the chassis (not shown in detail) of the vehicle 100 and respectively said first oscillating anchor arm B1 and said second oscillating anchor arm B2, wherein said cylinders first C1 and second C2 respectively comprise a first chamber and a second chamber both with variable volume as they are delimited respectively by a first translatable piston housed in the first cylinder C1 and a second translatable piston housed in the second cylinder C2 (according to methods substantially known and therefore not described in detail for the sake of brevity), said first chamber and second chamber containing an incompressible liquid, for example hydraulic oil.

As it is shown, the vehicle 100 comprises a power source consisting of a first electric motor 12 and a second electric motor 13, and a transmission system for the transmission of power from the first 12 and second 13 motors to the wheels R1 and R2 respectively.

The motors 12 and 13 are conveniently powered by a battery B and, according to an embodiment, they can be of the energy recovery type, i.e. capable of generating electricity, for example during braking and/or deceleration.

The battery B can also be rechargeable both through a socket connection (in the case of a fully electric vehicle) and by a generator driven by a combustion engine, in the case of a hybrid vehicle.

As mentioned above, a peculiarity of the present invention is represented by the fact that the electric motors 12 and 13 are completely independent of each other (see the following description), whereas a second important peculiarity of the present invention is represented by the fact that the transmission is configured to allow the transmission of power from the first motor 12 and from the second motor 13 to the drive wheels R1 and R2 in an equally independent way.

In the context of the present invention, the expression "independent motors" is intended to mean that the first motor 12 and the second motor 13 can be activated, deactivated, accelerated, decelerated, and therefore put into rotation each in two opposite directions of rotation (as indicated by the double arrows) completely independently of each other, where for example, the motor 12 can be rotated in a direction of rotation while the motor 13 can be simultaneously kept stopped or rotated in the opposite direction of rotation. The different combinations of independent use of said first motor 12 and second motor 13 are inherently clear and therefore a detailed description is omitted for sake of brevity.

According to an embodiment, said first motor 12 and second motor 13 each comprise a rotation shaft 14 and a second rotation shaft 15, wherein on said first rotation shaft 14 and second rotation shaft 15 a first pulley 16 and respectively a second pulley 17 are rigidly coupled, said first rotation shaft 14 and second rotation shaft 15, said first motor 12 and second motor 13 each being adapted, as mentioned above, to rotate said first rotation shaft 14 and respectively second rotation shaft 15 (and therefore said first pulley 16 and second pulley 17) in two opposite directions of rotation with variable rotation speed according to the needs and/or circumstances.

According to the embodiment shown in FIG. 2, the two motors 12 and 13 are arranged side by side with their respective rotation shafts 14 and 15 parallel, wherein the transmission system comprises a first transmission belt 18 which engages the first pulley 16 and a pulley 20 rigidly anchored to the wheel R1 (the belt 18 therefore extends between the pulley 16 and the pulley 20). In the same way, a transmission belt 19 engages the second pulley 17 (covered to the view in FIG. 2 by the motor 13) and a pulley 21 rigidly anchored to the wheel R2 (the belt 19 therefore extends between the pulley 17 and the pulley 21).

It is therefore clear from the above that the rotation of said first rotation shaft 14 and second rotation shaft 15 in counter clockwise and clockwise rotation directions (with respect to the figures), results in the rotation of the respective wheels R1 and R2 in the direction of travel and in the direction opposite to the direction of travel, respectively. In particular, the response of the vehicle deriving from the management of the two engines 12 and 13 according to the methods described above but in combination with the braking system, especially if equipped with an ABS device, can be seen.

In fact, imagining the vehicle unbalanced to the left and with both the left and right wheels braking (possibly also blocked or braking with different values defined by the ABS system, if present), a traction imparted to the left wheel in the direction of travel generates a torque on the vehicle from left to right, wherein also a traction contrary to the direction of travel imparted to the right wheel generates a torque on the vehicle from left to right, wherein the resultant of the two torques causes a rearrangement of the vehicle.

Figure 3:
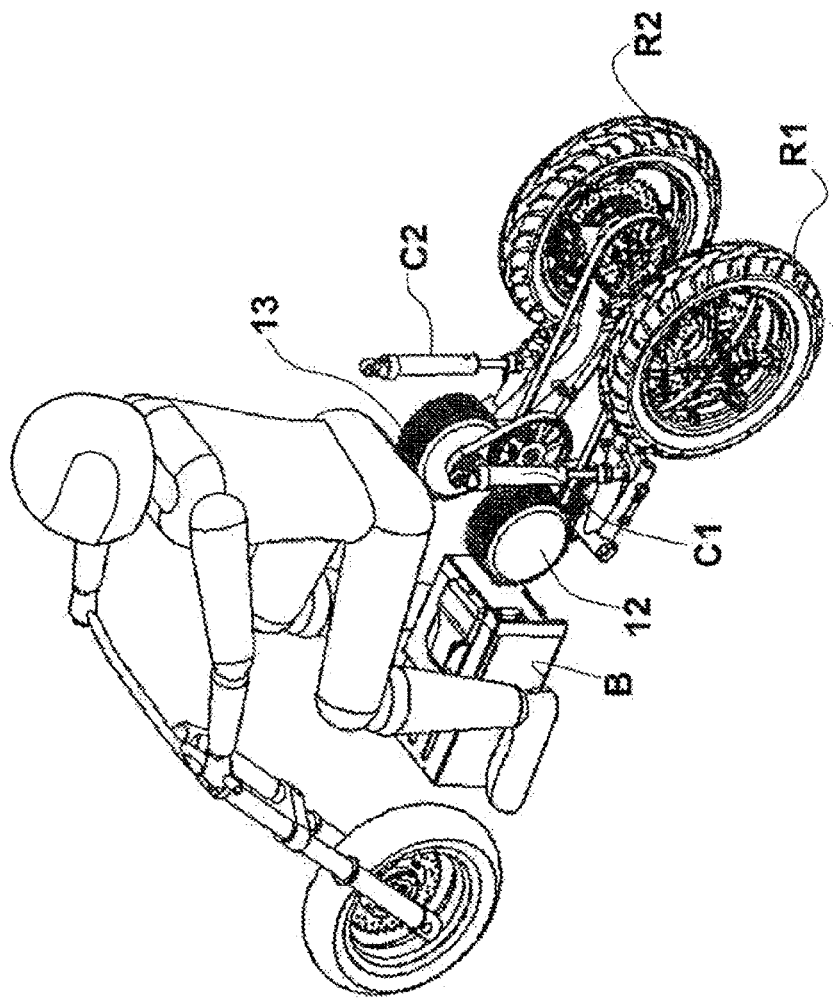
Figure 4:
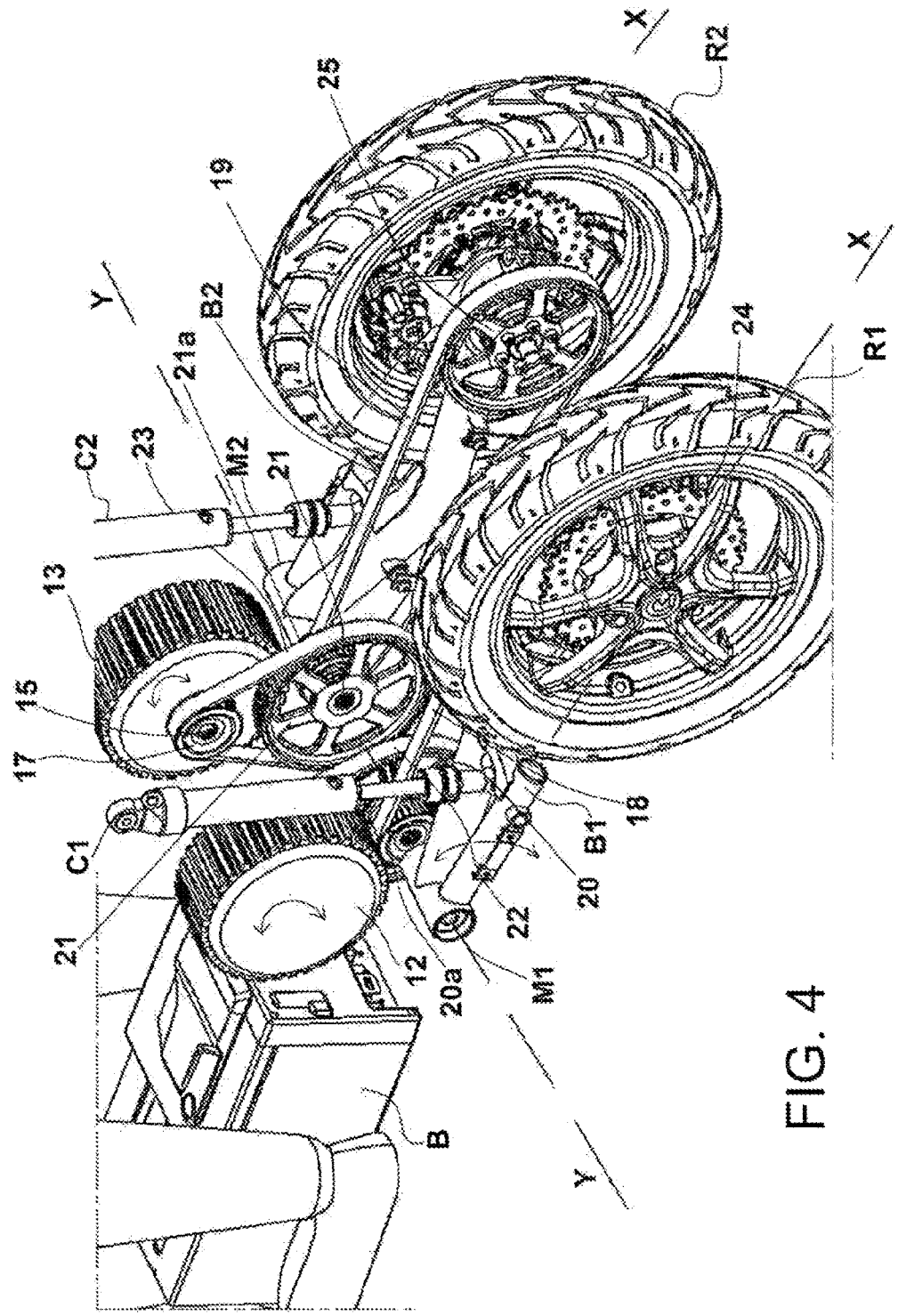

The embodiment shown in FIGS. 3 and 4 differs from that of FIGS. 1 and 2 in that said first motor 12 and second motor 13 are arranged so that the respective first rotation shaft and second rotation shaft are arranged along parallel axes and transversal with respect to vehicle 100, but offset from each other along the height and/or depth. In this case, the two pulleys 20 and 21 are idle and in an intermediate position between the pulley 14 and the wheel R1 and respectively the pulley 15 and the wheel R2, and driven in rotation by a belt 22 and a belt 23 respectively, wherein the belts 18 and 19 extend between a pulley 20a anchored to the pulley 20 and a pulley 24 rigidly anchored to the wheel R1 and respectively between a pulley 21a rigidly anchored to the pulley 21 and a pulley 25 rigidly anchored to the wheel R2.

As mentioned above, according to the present invention, the two electric motors 12 and 13 are managed by an electronic control unit (not shown in the figures) so that the respective rotation shafts 14 and 15 can be rotated independently according to the methods summarized above. For this purpose, said control unit is adapted to receive and process one or more parameters and to electrically control said first motor 12 and second motor 13 according to said one or more parameters, whereby the electrical control of said first motor 12 and second motor 13 according to said one or more parameters results into the transfer of power from said first motor 12 and second motor 13 to said first wheel R1 and second wheel R2 respectively, and therefore in the rotation of said first wheel R1 and second wheel R2, in ana independent manner and therefore with possibly different rotation speeds and in possibly different directions of rotation.

By way of non-limiting example, the vehicle's speed, inclination, engine rpm, etc. are among the parameters processed by the control unit, wherein said parameters are detected and communicated to the control unit by sensors (not shown in the figures) arranged on the vehicle. Alternatively, or in combination, the parameters processed by the control unit may include a signal indicating the activation and/or modulation of a control device, as a function of which the control unit adjusts the torque by one of the two electric motors 12, 13.

In addition, according to a preferred embodiment, each of the tilting drive wheels R1, R2 are associated with respective braking devices 31, 32 (e.g. conventional disc or drum brakes, well known to the person skilled in the art), which apply a braking torque to the respective R1, R2 drive wheel.

Below, a description of a possible use mode of the attitude control system according to the present invention will be given.

Assuming, for example, a situation in which the vehicle 100, when stationary or at reduced speed, is unbalanced laterally, for example to the left, i.e. counter clockwise for the driver, in which case a rotation torque contrary to the direction of travel imparted to the left driving wheel R1, in combination with a rotation torque in the direction of travel imparted to the right driving wheel R2 (the value of such rotation torques being adjusted according to needs and/or circumstances, for example the torque on the wheel R1 having a value proportional to the imbalance, and the torque on the R2 wheel having a value inversely proportional to the imbalance) generates a torque resulting clockwise (again with reference to the driver) managed by the control unit, and therefore the straightening of the vehicle.

The same maneuver can be made more effective, as described above, by also using the braking system, especially if equipped with an ABS system to support the delivery of the driving torque, especially in conditions of poor grip, and therefore for example by increasing the torque in the direction opposite to the rotation that acts on the braked wheel.

Similarly, during deceleration the engine brake can be used, determined by energy recovery (regenerative braking), appropriately managed and distributed between the drive wheels in order to obtain the stability control effect or to maintain the verticality of the vehicle.

In fact, by blocking, for example, the brake of the wheel R1, and by supplying a driving torque to the same wheel R1, the torque provided results in a rotation of the respective arm B1, and therefore in a thrust or traction capable of bringing the vehicle back into position.

Therefore, according to one aspect of the invention, it is possible to implement a method to influence the tilting and attitude of a tilting vehicle, configured according to one of the embodiments described above, by applying to the two tilting driving wheels R1, R2 (by means of the respective electric motors 12, 13 through the respective transmissions) respective rotation torques having opposite directions and/or different value, and/or by applying to at least one of the driving wheels R1, R2 a braking torque by means of the respective brake 31, 32, with simultaneous application to such at least one driving wheel R1, R2 of a driving torque (by means of the respective electric motor 12, 13 through the respective transmission), so as to cause rotation of the anchor arm B1, B2, associated with such at least one driving wheel R1, R2, around the respective axis of rotation Y transverse to the vehicle.

According to an embodiment, the above steps are carried out by applying to one or both drive wheels R1, R2 a rotation torque by means of the associated drive belt 18, 19, 22, 23, driven by the respective electric motor 12, 13.

Figure 5:
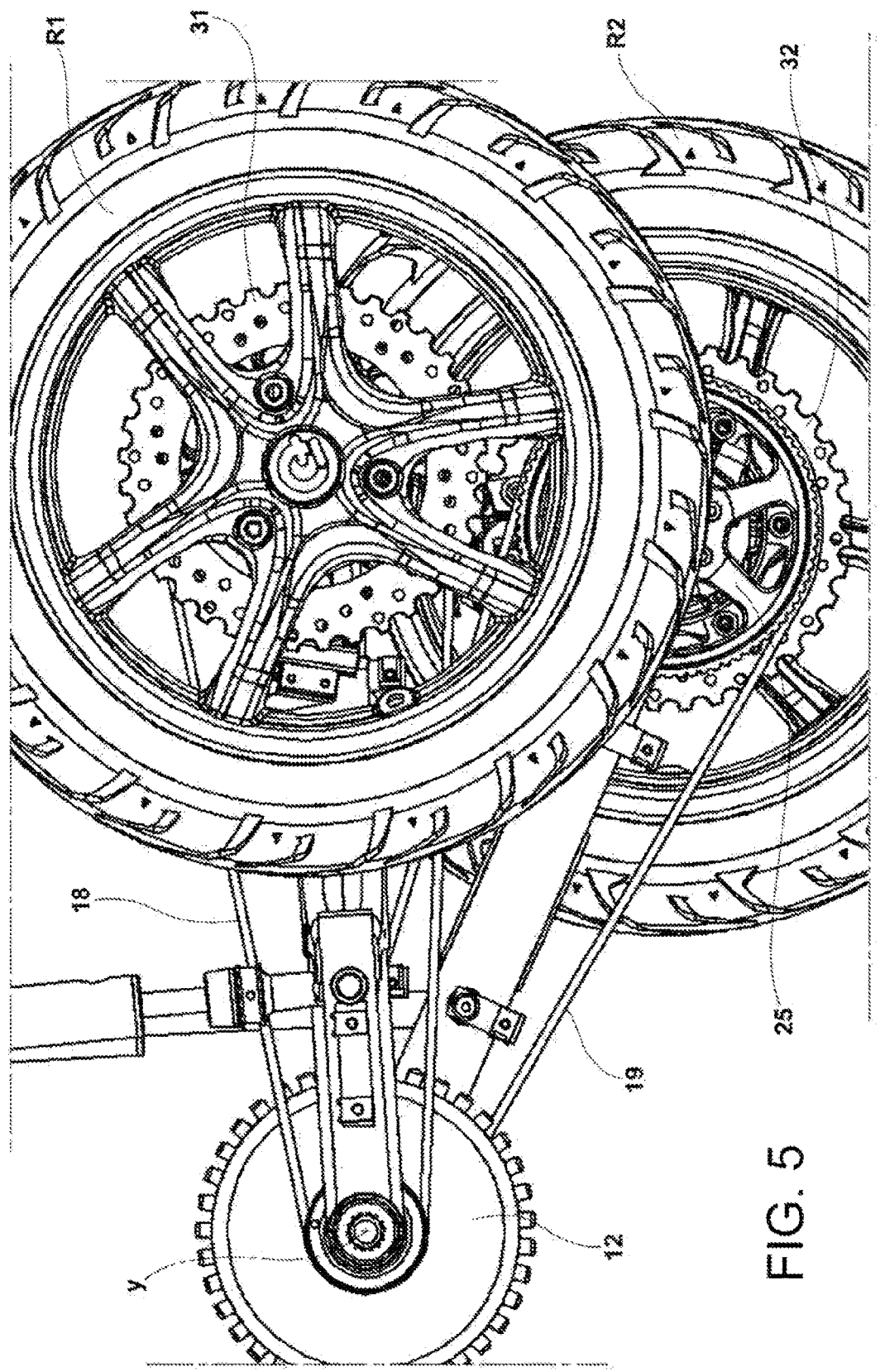
FIGS. 5 and 6 show two side views of two vehicle configurations in sequence in an operation mode in which an anchor arm is given an oscillation (clockwise in the example) around the transverse axis of rotation Y.
Figure 6:
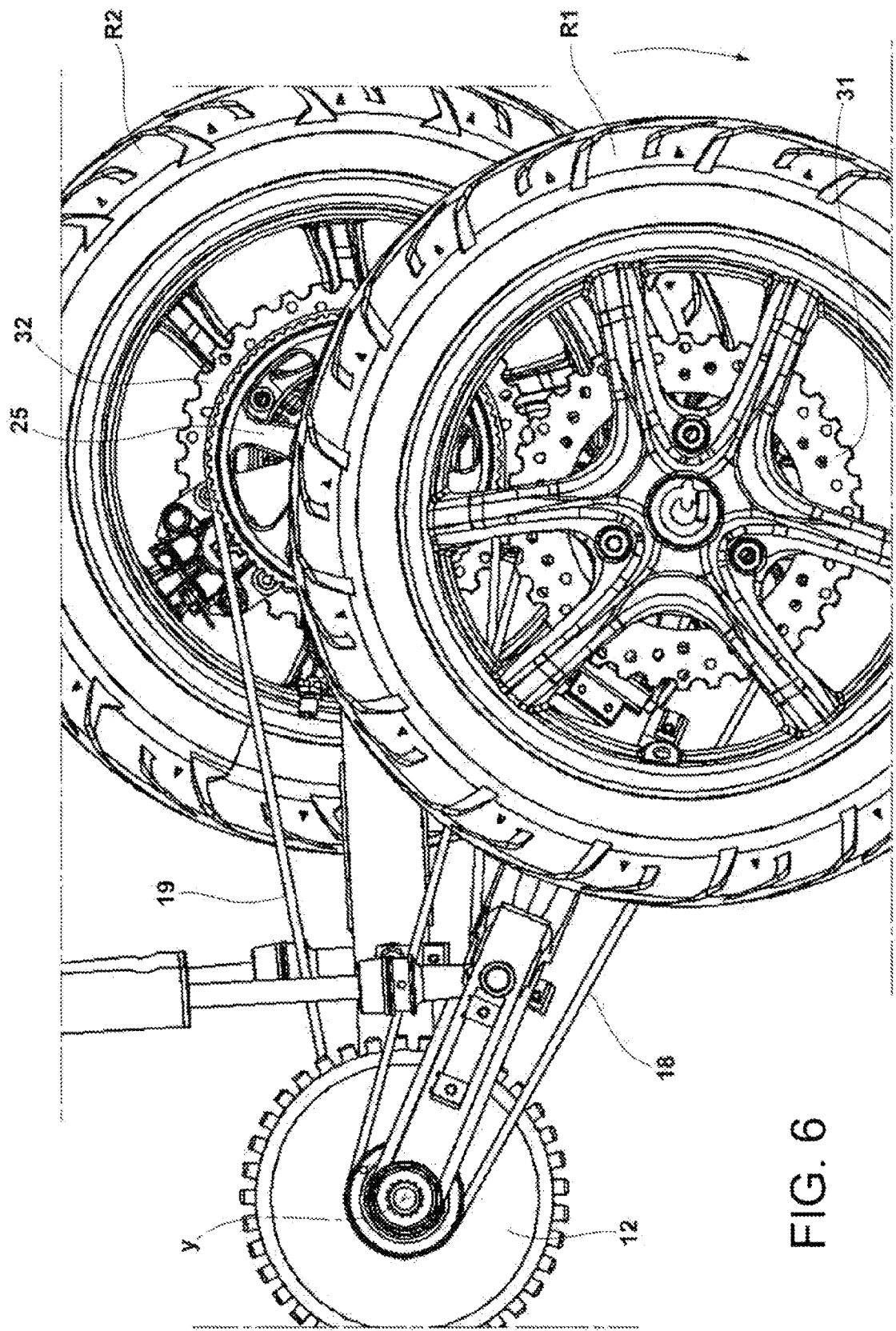

For example, as shown in FIGS. 5 and 6, it is possible to apply a braking torque to the first driving wheel R1 by means of the respective brake 31; the simultaneous application to such wheel R1 of a torque of rotation in clockwise direction (looking at the figure) will cause an oscillation of the respective anchor arm B1 in the direction of the arrow shown in FIG. 6, with a consequent modification of the vehicle attitude 100.

It has therefore been demonstrated by means of the previous detailed description of the embodiments of the present invention represented in the drawings, that the present invention allows to achieve the predetermined purposes overcoming the disadvantages by the prior art.

In particular, by the present invention, a solution is made available that allows the separate management of traction on the drive wheels of a vehicle, in particular of a motorcycle, and transforming said separate control of the drive wheels into an effective control of the vehicle and/or motorcycle attitude.

In particular, the present invention allows the vehicle to be kept in a substantially vertical position automatically, without requiring the driver to place his feet on the ground to maintain balance, and regardless of the conditions of the ground and road surface, in particular in "Quad mode" (see the previous description).

By means of the system according to the present invention, by controlling the torque imparted by the two electric motors to the two driving wheels, it is also possible to adjust the tilting angle (inclination) of the vehicle in normal driving conditions, therefore from low to high speeds, in this way controlling and guaranteeing stability, and therefore avoiding dangerous skidding.

In particular, through the present invention a device and/or system is made available which allows:
 guaranteeing the automatic maintenance of the verticality of three or more wheeled vehicles in the condition of use defined as the "quad mode", where the user normally uses his feet on the ground, that is, when driving at reduced speed and in temporary parking in general (red traffic light, stop etc.);
 performing and controlling the tilting of the above vehicles by implementing the ideal tilting angle according to contingent parameters of travel and/or use.

Furthermore, the device or system according to the present invention can be implemented in a wide range of vehicles and without requiring substantial modifications thereof, as well as installable by means of simple and fast operations, and therefore at low costs.

Although the present invention has been clarified above by a detailed description of the embodiments represented in the drawings, the present invention is not limited to the embodiments described above and represented in the drawings. On the contrary, all those modifications and/or constructional variations of the embodiments described above and represented in the drawings, which will appear obvious and immediate to those skilled in the art, fall within the scope of the present invention.

For example, according to the present invention, the pulleys previously described can be replaced by toothed pinions or toothed rings, wherein in this case the transmission belts can be replaced by respective transmission chains.

Furthermore, said first driving wheel R1 and second driving wheel R2 can be tilting (and therefore inclinable) each with respect to its own tilting axis X longitudinal with respect to the vehicle.

The scope of the present invention is therefore defined by the claims.

What is claimed is:

1. A motor vehicle with at least a first driving wheel tilting with respect to a first rotation axis transverse to said motor vehicle and a second driving wheel tilting with respect to a second rotation axis transverse to said motor vehicle, said motor vehicle comprising a power source for generating power and a transmission for transmitting power to said first tilting driving wheel and second tilting driving wheel, said power source comprising a first electric motor and a second electric motor, said first electric motor and second electric motor being separate and independent, said transmission comprising a first section and a second section configured to respectively and independently transmit power from said first electric motor to said first tilting driving wheel and from said second electric motor to said second tilting driving wheel, said motor vehicle further comprising an electronic control unit configured to receive and process one or more parameters and to control said first electric motor and second electric motor according to said one or more parameters, whereby control by the electronic control unit of said first electric motor and/or second electric motor depending on said one or more parameters results in a transmission of power from said first electric motor and/or second electric motor to respectively said first tilting driving wheel and/or second tilting driving wheel independently, wherein said first and second tilting driving wheels are mechanically anchored to a chassis of said motor vehicle by a first anchoring arm pivotable about said first rotation axis and a second anchoring arm pivotable about said second rotation axis, wherein said first tilting driving wheel is also pivotable with respect to a first tilting axis longitudinal with respect to said motor vehicle, and wherein said second tilting driving wheel is also pivotable with respect to a second tilting axis longitudinal with respect to said motor vehicle, and wherein, in a condition of lateral unbalance of the motor vehicle, the electronic control unit is configured to impart to a tilting driving wheel of said first and second tilting driving wheels located on a side of the motor vehicle towards which the lateral unbalance is occurring, a rotation torque contrary to a direction of travel of said tilting driving wheel, in combination with a rotation torque in the direction of travel to the other of said first and second tilting driving wheels, so as to cause straightening of the motor vehicle.

2. The motor vehicle of claim 1, wherein at least said first electric motor is configured to be rotated in two opposite directions of rotation so that the power generated and transmitted to said first tilting driving wheel results in a rotation of said first tilting driving wheel in the direction of travel and opposite to the direction of travel, respectively.

3. The motor vehicle of claim 2, wherein also said second electric motor is configured to be rotated in two opposite directions of rotation so that the power generated and transmitted to said second tilting driving wheel results in a rotation of said second tilting driving wheel in the direction of travel and opposite to the direction of travel, respectively.

4. The motor vehicle of claim 1, wherein said first electric motor or both said first electric motor and second electric motor are configured to transform a forced deceleration into electrical energy, and wherein the forced deceleration of said first electric motor or both said first electric motor and second electric motor is controlled by said electronic control unit according to said one or more parameters.

5. The motor vehicle of claim 1, wherein said first electric motor and second electric motor respectively comprise a first rotation shaft and a second rotation shaft, and wherein said first rotation shaft and second rotation shaft are respectively arranged parallel to said first rotation axis and second rotation axis of said first tilting driving wheel and second tilting driving wheel.

6. The motor vehicle of claim 5, wherein said first section and second section of said transmission respectively comprise a first pulley rigidly coupled to said first rotation shaft and a second pulley rigidly coupled to the second rotation shaft, and a first transmission belt and a second transmission belt driven in rotation by said first pulley and second pulley, respectively.

7. The motor vehicle of claim 6, wherein said first transmission belt and second transmission belt extend between said first pulley and second pulley and respectively a third pulley and a fourth pulley.

8. The motor vehicle of claim 7, wherein said third pulley and fourth pulley are rigidly coupled to said first tilting driving wheel and said second tilting driving wheel respectively.

9. The motor vehicle of claim 7, wherein said third pulley and fourth pulley are idle.

10. The motor vehicle of claim 6, wherein said first rotation shaft and second rotation shaft are arranged along a same axis parallel to said first rotation axis and second rotation axis of said first tilting driving wheel and second tilting driving wheel.

11. The motor vehicle of claim 6, wherein said first section and second section of said transmission respectively comprise a third transmission belt and a fourth transmission belt driven in rotation by said first pulley and second pulley, respectively.

12. The motor vehicle of claim 11, wherein in said first section and second section of said transmission said third pulley and fourth pulley are driven in rotation by said third transmission belt and fourth transmission belt, respectively.

13. The motor vehicle of claim 11, wherein said first transmission belt and second transmission belt respectively extend between said third pulley and a fifth pulley rigidly anchored to said first tilting driving wheel and said fourth pulley and a sixth pulley rigidly anchored to second tilting driving wheel.

14. The motor vehicle of claim 1, further comprising a plurality of sensors and/or measuring means for respectively detecting and/or measuring parameters including running speed, inclination of said chassis, and forces acting on said first anchoring arm and second anchoring arm, wherein said sensors and/or measuring means are connected to said electronic control unit and configured to communicate to said electronic control unit results of respective detections and/o measurements.

15. The motor vehicle of claim 1, wherein said first and second tilting driving wheels are positioned at the rear or front of the motor vehicle.

16. The motor vehicle of claim 1, wherein each tilting driving wheel of said first and second tilting driving wheels is associated with a respective brake, configured to apply a braking torque to the respective tilting driving wheel.

17. A method for adjusting tilting and attitude of a tilting vehicle, the method comprising the following steps:

(a) providing a motor vehicle with at least a first driving wheel tilting with respect to a first rotation axis transverse to said motor vehicle and a second driving wheel tilting with respect to a second rotation axis transverse to said motor vehicle, said motor vehicle comprising a power source for generating power and a transmission for transmitting power to said first tilting driving wheel and second tilting driving wheel, said power source comprising a first electric motor and a second electric motor, said first electric motor and second electric motor being separate and independent, said transmission comprising a first section and a second section configured to respectively and independently transmit power from said first electric motor to said first tilting driving wheel and from said second electric motor to said second tilting driving wheel, said motor vehicle further comprising an electronic control unit configured to receive and process one or more parameters and to control said first electric motor and second electric motor according to said one or more parameters, whereby control by the electronic control unit of said first electric motor and/or second electric motor depending on said one or more parameters results in a transmission of power from said first electric motor and/or second electric motor to respectively said first tilting driving wheel and/or second tilting driving wheel independently, wherein said first and second tilting driving wheels are mechanically anchored to a chassis of said motor vehicle by a first anchoring arm pivotable about said first rotation axis and a second anchoring arm pivotable about said second rotation axis, wherein said first tilting driving wheel is also pivotable with respect to a first tilting axis longitudinal with respect to said motor vehicle, wherein said second tilting driving wheel is also pivotable with respect to a second tilting axis longitudinal with respect to said motor vehicle, and wherein each tilting driving wheel of said first and second tilting driving wheels is associated with a respective brake, configured to apply a braking torque to the respective tilting driving wheel, and wherein, in a condition of lateral unbalance of the motor vehicle, the electronic control unit is configured to impart to a tilting driving wheel of said first and second tilting driving wheels located on a side of the motor vehicle towards which the lateral unbalance is occurring, a rotation torque contrary to a direction of travel of said tilting driving wheel, in combination with a rotation torque in the direction of travel to the other of said first and second tilting driving wheels, so as to cause straightening of the motor vehicle, and (b) imparting to the first and second tilting driving wheels, respectively by the first and second electric motors through their respective transmissions, respective rotation torques having opposite direction and/or different value, and/or imparting to at least one tilting driving wheel of said first and second tilting driving wheels a braking torque by the respective brake, and at the same time applying to said at least one tilting driving wheel a driving torque by the respective electric motor through the respective transmission to cause rotation of the anchoring arm associated with said at least one tilting driving wheel, about the respective rotation axis transverse to the motor vehicle.

18. The method of claim 17, wherein step (b) is carried out by applying to the at least one tilting driving wheel a driving torque by an associated transmission belt, driven by the respective electric motor.

* * * * *